June 9, 1964
A. M. ANDRANIGIAN
3,135,975
AMPHIBIOUS BOAT TRAILER
Filed March 8, 1962
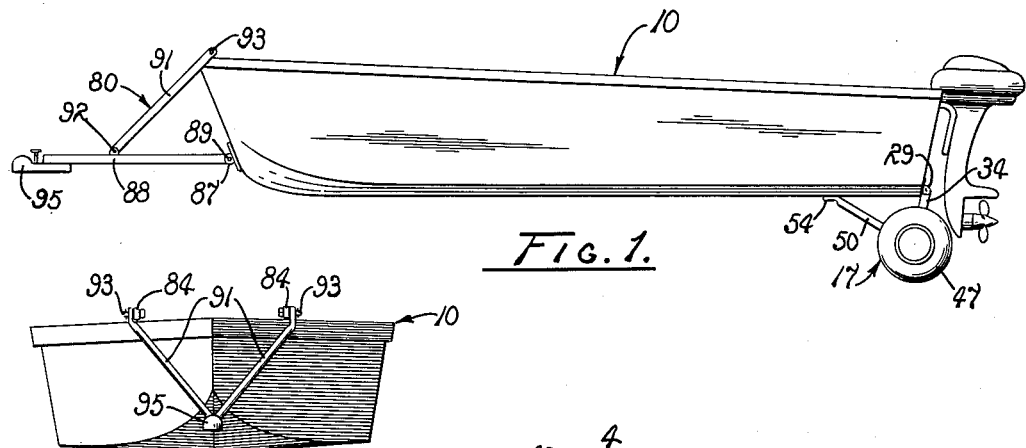
Fig. 1.
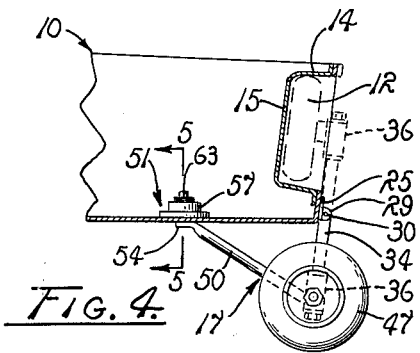
Fig. 2.
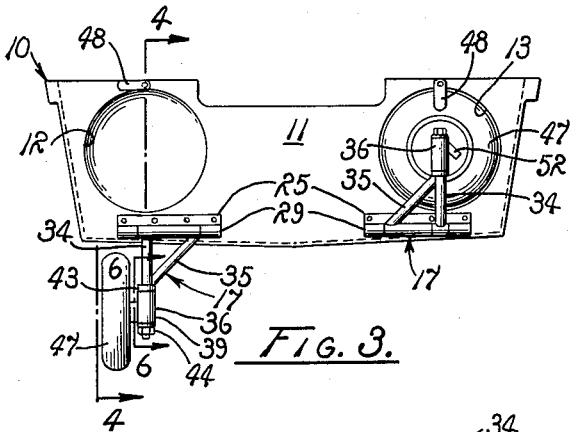
Fig. 3.
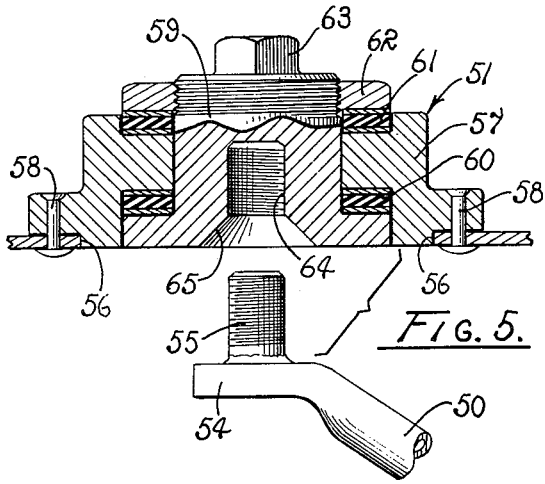
Fig. 4.
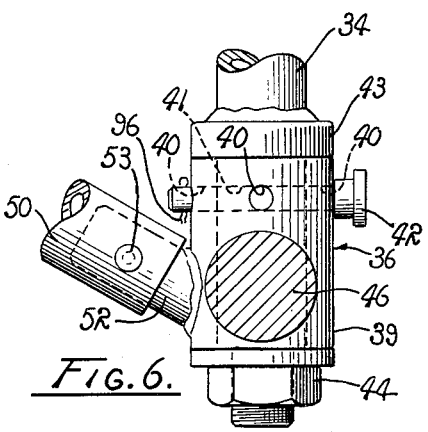
Fig. 5.
Fig. 6.
ASHOUN M. ANDRANIGIAN
INVENTOR
HUEBNER & WORREL
ATTORNEYS
BY
*Richard M. Worrel*

United States Patent Office 3,135,975
Patented June 9, 1964

3,135,975
AMPHIBIOUS BOAT TRAILER
Ashoun M. Andranigian, 19500 S. Highland, Laton, Calif.
Filed Mar. 8, 1962, Ser. No. 178,503
10 Claims. (Cl. 9—1)

This invention relates to an amphibious boat trailer and more particularly to such a structure utilizing a boat having ground support wheels which are retractable and storable without disengagement from the boat.

This invention is a continuation-in-part of application Serial No. 4,435 filed January 25, 1960, entitled "Combined Boat and Trailer Therefor," now abandoned.

The concept of combining a boat trailer and a boat in order to make an amphibious vehicle, rather than to provide a separate trailer for the boat, is shown in several issued United States Letters Patents. Nevertheless, the most popularly accepted means for transporting a small boat is the conventional separate trailer. The reason that this condition still exists is that, despite the many proposals for converting a boat into an amphibious vehicle, no one has developed or proposed a practical device having a reasonable cost and ease of operation.

Accordingly, it is an object of the present invention to provide a combined boat and retractable, mobile, running gear for road transport.

More specifically, it is an object of this invention to provide a boat with a road running gear which is movable between a supporting position adapting the boat for road travel, and a retracted position adapting the boat for use in the water.

Another, and more specific object of this invention, is to provide a retractable road running gear of this nature wherein the position of the gear is such that it enhances the trim of the boat as it is operated in the water.

A still further object of the invention is to provide such gear in a manner which is convenient to store when the vessel is used on water and does not detract from the appearance of the boat or from its utility.

Other objects and advantages of the present invention will become more fully apparent upon reference to the following description and accompanying drawing.

FIG. 1 is a side elevational view of a boat equipped with the road running gear of the present invention and with a trailer hitch structure extended from the boat for connection to a towing vehicle, not shown.

FIG. 2 is a front view of the boat and the trailer hitch mechanism but with the running gear thereof retracted.

FIG. 3 is a stern view of the combined structure, on an enlarged scale, with the motor removed, and with one of the wheels raised into a storage position and the other lowered into a ground engaging position.

FIG. 4 is a section taken on line 4—4 of FIG. 3.

FIG. 5 is an enlarged section taken on line 5—5 of FIG. 4.

FIG. 6 is an enlarged section taken on line 6—6 of FIG. 3.

Referring more particularly to the drawing, a boat is indicated generally by the reference character 10 in FIG. 1. It is to be understood that the principles of the present invention are applicable to various types of boats and that the invention is not to be limited to the precise type shown. The boat 10 is of substantially conventional construction, except for the modification provided by this invention, and includes a hull, circumscribed by a gunwale, and has a stem and a stern, as understood in the art and to which reference is subsequently made.

The modifications of the boat are incorporated principally in a transom structure 11 at the rear of the boat, and associated running gear stored in the transom during water use.

The transom panel 11 is constructed with a pair of cavities or recesses 12 and 13 opening outwardly of the hull. That is, the recesses extend inwardly from the exterior surface and are each defined by an annular side wall 14 and an inner back wall 15. With the exception of this fabricated construction of the transom 11, the hull of the boat is substantially conventional.

The stern of the boat is provided with a pair of independent running gear assemblies 17, each of which is supported by structure which causes it to swing up into the recesses for storage, and out of the recesses down to a road contacting position for carrying the weight of the boat when the boat is used as an overland trailer. To this end, bracket 25 is secured to the transom 11 below the cavity 12, and a similar bracket is secured to the transom 11 below the cavity 13. These brackets are provided for the purpose of establishing a pivot. The brackets each carry two spaced and axially aligned bearings 29 in the illustrated embodiment of the invention. The bearings of both brackets 25 are substantially aligned with one another transversely of the hull. A shaft 30 is journaled in the bearings 29 of each bracket and this shaft 30 serves as a pivot hinge or pintle.

The actual supporting structure consists of a main strut 34 and an auxiliary strut 35. Each of these struts 34 and 35 is rigidly connected to the shaft 30 in positions spaced longitudinally therealong. The struts converge outwardly from the shaft 30 and are united to form a rigid triangular relationship. It will be appreciated that this structure is swingable about the shaft 30 as a pivot, and hence can extend upwardly with respect to the transom 11 or hang in a depending position with respect to the brackets 25. The main strut 34 extends beyond the junction of the struts and this extension is referred to as an outer end.

The struts 34 and 35 can swing about shaft 30 but have no ability to rotate about their own longitudinal axle. Hence, a hub structure 36 is rotatably journaled on the outer end of the strut 34. The hub structure is essentially a sleeve 39 having an axial opening fitting closely upon the outer end of strut 34 and hence being rotatable as a bearing upon the strut. The sleeve 39 has two pairs of oppositely disposed and axially aligned openings 40 extended therethrough in 90° angular relationship. The strut 34 has a diametrical bore or opening 41 extended therethrough in position to register with the pairs of openings 40 upon rotation of the sleeve. Thus, the sleeve 39 may be selectively rotated into two rotationally spaced positions aligning pairs of the openings 40 with the bore 41 in the strut. Thereafter, a pin 42 may be extended through the aligned openings in the sleeve and in the strut in order to lock the hub structure in the selected position.

Finally, in order to hold the sleeve 39 in snug relationship upon the end of the strut in proper axial position, a thrust bearing 43 is provided on the strut above the sleeve and a lock nut 44 is secured to a threaded end of the strut. The lock nut 44 may be employed to compensate for looseness due to wear.

Each running gear 17 has an axle 46 extended radially from the hub 36 and has a wheel 47 journaled on the axle. The wheel is movable with the axle between a road engaging position, shown on the left side in FIG. 3, and the retracted position fitted within the storage recess 12, as shown on the right side in FIG. 3.

In the ground engaging position of the wheel, the sleeve portion 39 of the hub structure 36 is adjusted relative to the respective thrust bearing 43 so that the wheel is in a running position, and the two wheels on either side of the craft are in spaced parallel planes extending longitudinally of the hull with the axles substantially aligned transversely of the hull.

A small retaining lug 48 is pivoted to the transom 11 above each of the cavities 12 and 13 and may be moved into the position illustrated at the right in FIG. 3 to interfere with the movement of the wheel out of the cavity, and thus to retain the wheel in retracted position, and to the position illustrated at the left of FIG. 3, to release its respective wheel.

However, the structure so far described is not stable for ground transport and a bracing device is therefore needed and provided according to the principles of the invention to hold the wheels 47 in transport position during ground traversing movement. A bracing strut 50 is secured to each hub 36 and is extended to a holding assembly 51 provided in the bottom of the boat forwardly of the transom 11 and substantially aligned with the swinging plane of said hubs respective main strut 34. The brace 50 is illustrated as being tubular. When the wheel is positioned to operate on the road, the sleeve 39 has a face directed towards the front of the boat. A stub shaft 52 is rigidly mounted on this sleeve face as best illustrated in FIG. 6, and forwardly and obliquely upwardly extended therefrom. The stub shaft is of a size adapted to receive an end of the tubular brace 50 in slidably fitted relation thereover. Aligned diametrical bores are provided through the stub shaft and brace and a pin 53 slidably received in the aligned bores releasably to hold the brace and shaft in assembled relation. The brace 50 and pin 53 are preferably assembled on the stub shaft 52 before the wheel is swung downwardly as the running gear is being conditioned to support the boat upon the highway. By like token, it is removed as the wheel is brought up into the storage position. The brace may be assembled and disassembled while the wheel is fully in its storage recesses, if desired.

Each brace 50 has an opposite retaining end 54 provided with a threaded stub shaft 55 which extends upwardly whenever the brace 50 is secured to the stub shaft 52 of the hub and its respective wheel 47 is in transport position. Each holding assembly 51 is provided to receive its respectively adjacent stub shaft 55 and to secure that stub shaft tightly to the boat bottom without requiring the operator to go under the boat at any time. An opening 56 is provided in he bottom wall of the boat, and a retainer body 57 is secured in the opening by means of rivets 58. A central turret member 59 is carried by the retaining body 57 and is made water-tight and relatively rotatable by means of packing glands 60 and 61 composed of atlernate annular washers of rubber between hard surface material having a low coefficient of friction, such as Teflon. A locking nut 62 is screw-threadably mounted on the upper end of the turret member to produce a compressive force upon the two packing glands and to provide additional pressure from time to time as wear occurs. The turret is rotatable by application of a wrench to an integral wrench head 63.

An axial threaded bore 64 opening from the bottom of the turret is provided to accept the stub shaft 55. The bore 64 preferably has a funnel mouth area to enable the stub 55 to be directed into the bore threaded portion in the event of slight misalignment of the brace 50.

To complete the amphibious boat trailer for use as a land vehicle, a hitch 80 is provided in order that it may be pulled by a motorized vehicle. As best seen in FIGS. 1 and 2, a pair of upper brackets 84 are connected to opposite sides of the gunwale of the boat in spaced relation to the bow thereof and are upwardly extended. A lower bracket 87 is connected to the stem of the boat and extends forwardly therefrom. An elongated tongue 88 has a rearward end releasably pivotally connected to the lower bracket by means of a pin 89. Elongated braces 91 have lower forward ends pivotally connected by a common pin 92 to the tongue intermediate the forward and rearward ends thereof and are divergently upwardly extended therefrom. The bars have rear upper ends individually pivotally connected by pins 93 to the upper bracket 84. A coupling member 95 is forwardly extended from the tongue. The coupling member is a suitable trailer hitch type as known and used in the trailer art for such purposes. By removing the pins 87 and 93, the entire hitch 80, except for the brackets 84 and 87, can be removed from the boat 10 for stowage purposes.

*Operation*

The operation of the described embodiment of the present invention is believed to be readily apparent and is briefly summarized at this point. The amphibious boat trailer is adapted for road or other ground travel in the condition shown in FIG. 1. For this purpose, the coupling member 95 is simply connected to any suitable towing vehicle capable of supporting the bow of the boat and the boat is transported on the wheels 47.

For use on water, the boat 10 is first floated. The pins 93 and 87 are withdrawn and the hitch 80 is removed and stowed for subsequent use. The turret members 59 are rotated from within the boat, by any suitable wrench, not shown, to release the stub shafts 55. The struts 34 are then swung rearwardly for convenient access to the pins 53 from within the boat. These pins are withdrawn and the braces 50 removed from their respective stub shafts 52 and likewise stowed for subsequent use. One at a time, the pins 42 are withdrawn from their respective bores 40 and 41, the sleeve portions 39 are rotated a quarter turn on their respective struts 34 and the pins are returned to the then aligned bores 40 and 41. This repositions the wheels 47 transversely of their normal running positions.

The retaining lugs 48 are pivoted to their retracted positions, as shown at the right of FIG. 3, and the running gears 17 are pivoted upwardly with the wheels 47 nested in their respective cavities 12 and 13 as shown at the right of FIG. 3. The lugs 48 are then returned to latching position and serve to hold the running gears in retracted position for use of the boat 10 for water travel.

To return the boat 10 to the condition for land travel, the reverse procedure is followed. The lugs 48 are first retracted. The running gears 17 are pivoted downwardly, the sleeve portions 36 are released, rotated a quarter turn to align the wheels 47 with the intended direction of boat transport, and locked in position by return of the pins 42 to their respective bores. Such pins are preferably constrained against inadvertent removal by cotter keys 96 or other suitable means. The braces 50 are then replaced on their stub shafts 52, locked in place by the pins 53 and the running gears 17 pivoted downwardly and forwardly to locate the stub shafts 55 in the bores 64 of the turret members 59. The turret members are then rotated from within the boat to tighten the same on the stub shafts. The hitch 80 is reinstalled and the amphibious boat trailer is ready for land travel.

From the preceding description, it will be clearly apparent the amphibious boat trailer of the present invention is simply and easily converted for land and water travel. All conversion requirements can be made from within the boat so as to avoid the normally conventionally required manipulation of parts from the water. It is simple in structure, dependable in operation and economical to provide and maintain. When adapted for water travel, the running gear is completely retracted and offers no interference with boat operation or water resistance. When conditioned for ground travel, the running gear is fully effective and safe to utilize.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An amphibious boat and trailer comprising a boat having a bottom and a transom, a pair of struts pivotally mounted on the transom in spaced relation transversely of the boat for movement between downwardly extended positions and upwardly retracted positions, a wheel rotatably mounted on each strut disposed for ground engagement when its strut is downwardly extended, and a brace releasably connected to each strut adjacent to the wheel thereof and having an end forwardly extended beneath the boat when its strut is in downwardly extended position, and means extended through the bottom of the boat being operable from within the boat releasably interconnecting the forwardly extended end of each brace and the bottom of the boat.

2. In a boat adapted for earth traversing movement and including a bottom and a transom, said transom having two laterally spaced housing cavities indented inwardly thereof and opening exteriorly of the boat, a pair of running gear assemblies each comprising a pivot mount secured to the transom below a cavity, strut support means pivotally carried by the pivot mount for movement between a downwardly extended position and an upwardly retracted position, a wheel structure carried by the strut support means at the end thereof opposite to said pivot mount, said wheel structure having a first locked position on its strut support means wherein the wheel structure extends longitudinally of the boat and a second locked position wherein the wheel structure extends transversely of said boat and is disposed for reception in the cavity when the support means is in the retracted position, a removable brace connected to the strut support means and having a forward end, and fastener means extended through the bottom of the boat to connect the forward end of the brace to the boat forwardly of the wheel and transom releasably to hold the support means in downwardly extended position.

3. An amphibious boat trailer comprising a hull including a transom, said transom having two laterally spaced recesses indented inwardly thereof and opening exteriorly of the hull, a running gear assembly associated with each recess, a strut for each running gear assembly, each strut having an inner end pivotally connected to the transom below its respective cavity for movement between a downwardly extended position and an upwardly retracted position, each said strut having an outer end, a sleeve rotatably journaled on each strut, a wheel rotatably mounted on each sleeve, means releasably interconnecting each sleeve and its respective strut in selected positions in substantially ninety degree rotated relation whereby each wheel can be located in a ground engaging position with its axis of rotation disposed transversely of the hull and a retracted position with its axis of rotation disposed longitudinally of the hull, and means for selectively holding each strut in downwardly extended position with its respective wheel in ground engagement and in retracted position with its respective wheel disposed in its respective cavity.

4. An amphibious boat and trailer comprising a boat having a transom, a pair of hinge members mounted on the transom in spaced relation transversely of the boat having substantially aligned pivot pins, a strut mounted on each hinge member for movement between a downwardly extended position and an upwardly retracted position, a sleeve rotatably mounted on each strut, a wheel rotatably mounted on each sleeve for rotation about an axis transversely of its respective sleeve, means releasably interconnecting each sleeve and its respective strut whereby the wheels can be selectively positioned with their axes disposed transversely of the boat for ground travel and disposed longitudinally of the boat for compact stowage for water travel, a brace releasably connected to each sleeve and forwardly extended therefrom when its respective strut is downwardly extended, means operable from within the boat for releasably interconnecting the braces and the boat at positions forwardly of the struts to hold the struts in downwardly extended positions, and releasable lugs mounted on the transom engageable with the wheels to hold the wheels flatly against the transom when their respective struts are upwardly extended and their respective axes are disposed longitudinally of the boat.

5. An amphibious boat and trailer comprising a boat having a transom providing a pair of rearwardly disposed transversely spaced recesses, a pair of hinge members mounted on the transom in spaced relation transversely of the boat individually beneath the recesses and having substantially aligned pivot pins, a strut mounted on each hinge member for movement between a downwardly extended position and an upwardly retracted position, a sleeve rotatably mounted on each strut, a wheel rotatably mounted on each sleeve for rotation about an axis transversely of its respective sleeve, the wheels being receivable by the recesses, means releasably interconnecting each sleeve and its respective strut whereby the wheels can be selectively positioned with their axes disposed transversely of the boat for ground travel and disposed longitudinally of the boat for compact stowage in the recesses for water travel, a brace releasably connected to each sleeve and forwardly extended therefrom when its respective strut is downwardly extended, means operable from within the boat for releasably interconnecting the braces and the boat at positions forwardly of the struts to hold the struts in downwardly extended positions and releasable lugs mounted on the transom engageable with the wheels to hold the wheels within their respective recesses when their struts are upwardly extended and their axes are disposed longitudinally of the boat.

6. In an amphibious boat, a strut having a longitudinal axis mounted on the boat for pivotal movement between a downwardly extended position and an upwardly retracted position about a pivot axis transversely of the boat, a wheel, means mounted on the strut including an axle disposed transversely of the strut having the wheel rotatably mounted thereon, said axle being adjustably positionable about the longitudinal axis of the strut between a position with the axle disposed transversely of the boat for ground travel when the strut is downwardly extended and a position disposed longitudinally of the boat for compact stowage for water travel when the strut is upwardly retracted, means connected to the strut engageable with the boat to hold the strut in downwardly extended position, and means on the strut for securing the axle selectively in said positions relative to the boat.

7. In an amphibious boat and trailer, a boat having a transom, a hinge member mounted on the transom, a strut mounted on the hinge member for movement between a downwardly extended position and an upwardly retracted position, a sleeve rotatably mounted on the strut, a wheel rotatably mounted on the sleeve for rotation about an axis transversely of the sleeve, means releasably interconnecting the sleeve and the strut whereby the wheel can be selectively positioned with its axis disposed transversely of the boat for ground travel and disposed longitudinally of the boat for compact stowage for water travel, a brace releasably connected to the sleeve and forwardly extended therefrom when the strut is downwardly extended, and means operable from within the boat for releasably interconnecting the brace and the boat at a position forwardly of the strut to hold the strut in downwardly extended position.

8. An amphibious boat and trailer comprising a boat having a bottom and a transom, a pair of hinge members mounted on the transom in spaced relation transversely of the boat having substantially aligned pivot pins, a strut mounted on each hinge member for movement between a downwardly extended position and an upwardly retracted position, a wheel individual to each strut, means mounting the wheels on their respective struts for rotation about axes radially disposed to their respective struts, said axes being rotationally positionable about their respective struts between alternate substantially aligned positions transversely of the boat when the struts are downwardly extended and positions disposed substantially longitudinally of the boat when the struts are upwardly retracted, means releasably interconnecting the mounting means and their respective struts whereby the wheels can be selectively locked in said alternate positions of the axes, and means borne by the struts being connectable with the bottom of the boat to lock the struts in downwardly extended position for transport purposes.

9. In a boat adapted for earth traversing movement and including a transom, a pair of running gear assemblies each comprising a pivot mount secured to the transom, strut support means pivotally carried by the pivot mount for movement between a downwardly extended position and an upwardly retracted position, a wheel structure carried by the strut support means at the end thereof opposite to said pivot mount, said wheel structure having a first locked position on its strut support means wherein the wheel structure extends longitudinally of the boat and a second locked position wherein the wheel structure extends transversely of said boat, and a removable brace interconnecting the strut support means and the boat forwardly thereof releasably to hold the support means in downwardly extended position.

10. The device of claim 9 in which the transom has cavity means indented inwardly thereof and opening rearwardly exteriorly of the boat disposed to receive the wheel structures when the support means are in retracted position.

References Cited in the file of this patent
UNITED STATES PATENTS

| | | |
|---|---|---|
| 2,551,040 | Newell | May 1, 1951 |
| 2,838,319 | Besser | June 10, 1958 |
| 2,863,159 | Bear | Dec. 9, 1958 |
| 2,916,747 | Parrott | Dec. 15, 1959 |
| 3,085,261 | Kennedy | Apr. 16, 1963 |